United States Patent
Lin et al.

(10) Patent No.: US 10,531,467 B2
(45) Date of Patent: Jan. 7, 2020

(54) METHOD AND APPARATUS FOR A WIRELESS COMMUNICATION SYSTEM FOR FACILITATING AN INITIAL ACCESS COMMUNICATION BETWEEN A MOBILE DEVICE AND A NETWORK CELL THAT SUPPORTS MULTIPLE NUMEROLOGIES

(71) Applicant: ASUSTeK COMPUTER INC., Taipei (TW)

(72) Inventors: Ko-Chiang Lin, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/660,500

(22) Filed: Jul. 26, 2017

(65) Prior Publication Data
US 2018/0035421 A1 Feb. 1, 2018

Related U.S. Application Data

(60) Provisional application No. 62/368,446, filed on Jul. 29, 2016.

(51) Int. Cl.
*H04W 4/00* (2018.01)
*H04W 72/04* (2009.01)
(Continued)

(52) U.S. Cl.
CPC ......... *H04W 72/048* (2013.01); *H04W 48/12* (2013.01); *H04W 56/001* (2013.01);
(Continued)

(58) Field of Classification Search
CPC ............... H04L 27/2655; H04L 27/265; H04L 27/2666; H04L 5/0007; H04L 5/0048;
(Continued)

(56) References Cited

U.S. PATENT DOCUMENTS

2006/0136350 A1\* 6/2006 Jackson ................. G06F 16/00
706/46
2007/0058595 A1\* 3/2007 Classon ................ H04L 1/1812
370/337
(Continued)

FOREIGN PATENT DOCUMENTS

WO 2015001369 A1 1/2015
WO 2015012654 A1 1/2015
(Continued)

OTHER PUBLICATIONS

3GPP, LG Electronics, Support different numerology and different usage scenarios Discussion and Decision, 3GPP TSG RAN WG1 Meeting #85, R1-164561, Nanjing, China May 23-27, 2016 , p. 1-6.\*
(Continued)

*Primary Examiner* — Mahendra R Patel
(74) *Attorney, Agent, or Firm* — Blue Capital Law Firm, P.C.

(57) ABSTRACT

Techniques for gaining initial access of a cell by a mobile device by using multiple numerologies associated with the orthogonal frequency division multiplexing (OFDM) are disclosed. The multiple numerologies are selected from numerologies that are both offered by the cell and which can be processed by the mobile device that is trying to gain the initial access. For example, one numerology can be used for the synchronization portion of the initial access and a different numerology can be use for the system information gathering and random access portions of the initial access. Also, upon gaining the initial access, the mobile device can be configured to use more numerologies for data communication, either simultaneously or one numerology at a time.

19 Claims, 15 Drawing Sheets

(51) Int. Cl.
*H04W 48/12* (2009.01)
*H04W 56/00* (2009.01)
*H04W 74/00* (2009.01)
*H04W 74/08* (2009.01)
*H04L 5/00* (2006.01)
*H04W 72/02* (2009.01)
*H04W 88/06* (2009.01)
*H04W 48/18* (2009.01)

(52) U.S. Cl.
CPC ..... *H04W 74/006* (2013.01); *H04W 74/0833* (2013.01); *H04L 5/0048* (2013.01); *H04W 48/18* (2013.01); *H04W 72/02* (2013.01); *H04W 88/06* (2013.01)

(58) Field of Classification Search
CPC ......... H04W 72/0413; H04W 74/0833; H04W 72/048; H04W 72/04; H04W 74/08; H04W 48/16; H04W 52/32; H04W 52/24; H04W 48/12; H04W 52/146; H04W 52/242; H04W 52/322; H04W 72/042; H04W 48/18; H04W 88/06; H04W 72/02; H04J 11/0069
USPC .......... 370/329, 337, 312; 375/340; 455/522
See application file for complete search history.

(56) References Cited

U.S. PATENT DOCUMENTS

| | | | |
|---|---|---|---|
| 2007/0097901 A1* | 5/2007 | Tirkkonen | H04J 11/0076 370/318 |
| 2008/0025241 A1* | 1/2008 | Bhushan | H04L 12/189 370/312 |
| 2008/0025267 A1* | 1/2008 | Wei | H04L 1/0025 370/337 |
| 2008/0031186 A1* | 2/2008 | Onggosanusi | H04W 72/1284 370/328 |
| 2008/0039133 A1* | 2/2008 | Ma | H04L 27/2626 455/552.1 |
| 2010/0027486 A1* | 2/2010 | Gorokhov | H04B 1/7075 370/329 |
| 2016/0142981 A1* | 5/2016 | Yi | H04J 11/0069 455/522 |
| 2016/0143030 A1* | 5/2016 | Lee | H04L 5/00 370/329 |
| 2016/0156492 A1* | 6/2016 | Martinez | H04L 27/2655 375/340 |
| 2016/0219498 A1* | 7/2016 | Abraham | H04W 48/16 |
| 2016/0269135 A1* | 9/2016 | Jiang | H04L 5/0037 |
| 2016/0352551 A1* | 12/2016 | Zhang | H04L 27/2602 |

FOREIGN PATENT DOCUMENTS

| WO | WO 2015001369 A1 * | 1/2015 | ......... H04L 27/2655 |
|---|---|---|---|
| WO | 2016206763 A1 | 12/2016 | |

OTHER PUBLICATIONS

"Beam Forming Impacts," 3GPP TSG-RAN WG2 Meeting #93bis, Apr. 2016, R2-162366, Nokia, Alcatel-Lucent Shanghai Bell, Dubrovnik, Croatia, 3 pages.
"Discussion on terminology of beamforming based high frequency NR," 3GPP TSG-RAN WG2 Meeting #94, May 2016, R2-163716, Samsung, Nanjing, China, 4 pages.
"Beam support in NR," 3GPP TSG RAN WG2 Meeting #93bis, Apr. 2016, R2-162709, Intel Corporation, Dubrovnik, Croatia, 4 pages.
"Active Mode Mobility in NR: SINR drops in higher frequencies," 3GPP TSG-RAN WG2 #93bis, Apr. 2016, R2-162762, Ericsson, Dubrovnik, Croatia, 4 pages.
"Radio Access Architecture and Interfaces," 3rd Generation Partnership Project, Technical Specification Group Radio Access Network, Study on New Radio Access Technology, 3GPP TR 38.801, Apr. 2106, V0.1.0, Release 14, 17 pages.
"Summary of email discussion [93bis#23][NR] Deployment scenarios," 3GPP TSG-RAN WG2 #94, May 2016, R2-164306, Revision of R2-163399, NTT Docomo, Inc., Nanjing, China, 18 pages.
"3GPP TDocs (written contributions) at meeting," Meeting: R2-94, May 2016, Nanjing, China, 38 pages. http://www.3gpp.org/DynaReport/TDocExMtg--R2-94-31668.htm.
"RAN2 Impacts in HF-NR," 3GPP TSG-RAN WG2 #94, May 2016, R2-163879, MediaTek Inc., Nanjing, China, 5 pages.
"Beam level management <-> Cell level mobility," 3GPP TSG-RAN WG2 Meeting #93bis, Apr. 2016, R2-162210, Samsung, Dubrovnik, Croatia, 4 pages.
"Cell concept in NR," 3GPP TSG RAN WG2 Meeting #94, May 2016, R2-163471, CATT, Nanjing, China, 4 pages.
"General considerations on LTE-NR tight interworking," 3GPP TSG-RAN WG2 Meeting #94, May 2016, R2-164270, Huawei, HiSilicon, Nanjing, China, 3 pages.
"RAN2 aspects of high frequency New RAT," 3GPP TSG-RAN WG2 Meeting #93bis, Apr. 2016, R2-162251, Samsung, Dubrovnik, Croatia, 8 pages.
"Discussion on Beam Measurement and Tracking for 5G New Radio Interface in mmWave Frequency Bands," 3GPP TSG RAN WG2 #93bis, Apr. 2016, R2-162226, Samsung, Dubrovnik, Croatia, 5 pages.
"Mobility Supporting for HF-NR," 3GPP TSG-RAN WG2 #94, May 2016, R2-163484, MediaTek Inc., Nanjing, China, 6 pages.
"Evolved Universal Terrestrial Radio Access (E-UTRA) and Evolved Universal Terrestrial Radio Access Network (E-UTRAN)," 3rd Generation Partnership Project, Technical Specification Group Radio Access Network, Overall Description, 3GPP TS 36.300, Mar. 2016, V13.3.0, 295 pages.
"Radio Resource Control (RRC)—Protocol specification," 3rd Generation Partnership Project, Technical Specification Group Radio Access Network, Evolved Universal Terrestrial Radio Access (E-UTRA), 3GPP TS 36.331, Mar. 2016, V13.1.0, 177 pages.
"User Equipment (UE) procedures in idle mode," 3rd Generation Partnership Project, Technical Specification Group Radio Access Network, Evolved Universal Terrestrial Radio Access (E-UTRA), 3GPP TS 36.304, Mar. 2016, V13.1.0, 43 pages.
Ericsson, "SI: Study on Latency reduction techniques for LTE," 3GPP TSG RAN Meeting #67, Mar. 2015, RP-150465, Shanghai, China, 8 pages.
"Physical Layer Procedures," 3rd Generation Partnership Project, Technical Specification Group Radio Access Network, Evolved Universal Terrestrial Radio Access (E-UTRA), 3GPP TS 36.213, Mar. 2016, V13.1.1, 361 pages.
"Physical Channels and Modulation," 3rd Generation Partnership Project, Technical Specification Group Radio Access Network, Evolved Universal Terrestrial Radio Access (E-UTRA), 3GPP TS 36.211, Mar. 2016, V13.1.0, 155 pages.
"Multiplexing and Channel Coding," 3rd Generation Partnership Project, Technical Specification Group Radio Access Network, Evolved Universal Terrestrial Radio Access (E-UTRA), 3GPP TS 36.212, Mar. 2016, V13.1.0, 129 pages.
"DL Channel Design for Shortened TTI", 3GPP TSG RAN WG1 #84bis, Apr. 2016, R1-163068, Qualcomm Incorporated, Busan, Korea, 7 pages.
European Office Action and Extended Search Report for European Patent Application No. 17183287.6 dated Dec. 4, 2017, 10 pages.
"Support different numerology and different usage scenarios," 3GPP TSG RAN WGl Meeting #85, May 2016, R1-164561, LG Electronics, Nanjing, China, 6 pages.
"Initial access in NR," 3GPP TSG-RAN WG2 Meeting #94, May 2016, R2-163923, Huawei, HiSilicon, Nanjing, China, 4 pages.
European Office Action for European Patent Application No. 17183287.6 dated Nov. 26, 2018, 7 pages.

* cited by examiner

METHOD AND APPARATUS FOR A WIRELESS COMMUNICATION SYSTEM FOR FACILITATING AN INITIAL ACCESS COMMUNICATION BETWEEN A MOBILE DEVICE AND A NETWORK CELL THAT SUPPORTS MULTIPLE NUMEROLOGIES

CROSS-REFERENCE TO RELATED APPLICATIONS

This application claims the benefit of U.S. Provisional Application Ser. No. 62/368,446, filed Jul. 29, 2016, and entitled "METHOD AND APPARATUS FOR INITIAL ACCESS IN A CELL WITH MULTIPLE NUMEROLOGIES IN A WIRELESS COMMUNICATION SYSTEM," the entirety of which is expressly incorporated herein by reference.

TECHNICAL FIELD

The subject disclosure relates generally to communications systems, and specifically to the initial access process that occurs between a mobile device and a network cell in a wireless communications system.

BACKGROUND 5G, the next telecommunications standard, will likely use the signal modulation format known as orthogonal frequency divisional multiplexing (OFDM). The new radio access technologies (NR), on which the 5G radio access will be built, will provide networks that support multiple numerologies. Numerology refers to the particular parameters that are selected for performing a given OFDM communication including, for example, subcarrier spacing, symbol duration, cyclic prefix and resource block size. The simultaneous usage of multiple numerologies will allow the NR networks to communicate at higher data rates and lower latencies than is presently possible. However, mobile devices are expected to vary in their capabilities in accommodating the different numerologies offered by a given network. For example, a particular mobile device may be able to handle only one or a few of the numerologies offered by a network on which it is camped. Initial access refers to the process that occurs between the time when a mobile device is first powered on (or first arrives within the coverage range of a network cell) and when it begins transmitting/receiving user data to/from the cell. The inventions disclosed herein relate to efficiently selecting one or more appropriate numerologies for performing the initial access communication in a network environment that supports multiple numerologies.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Figure 1:
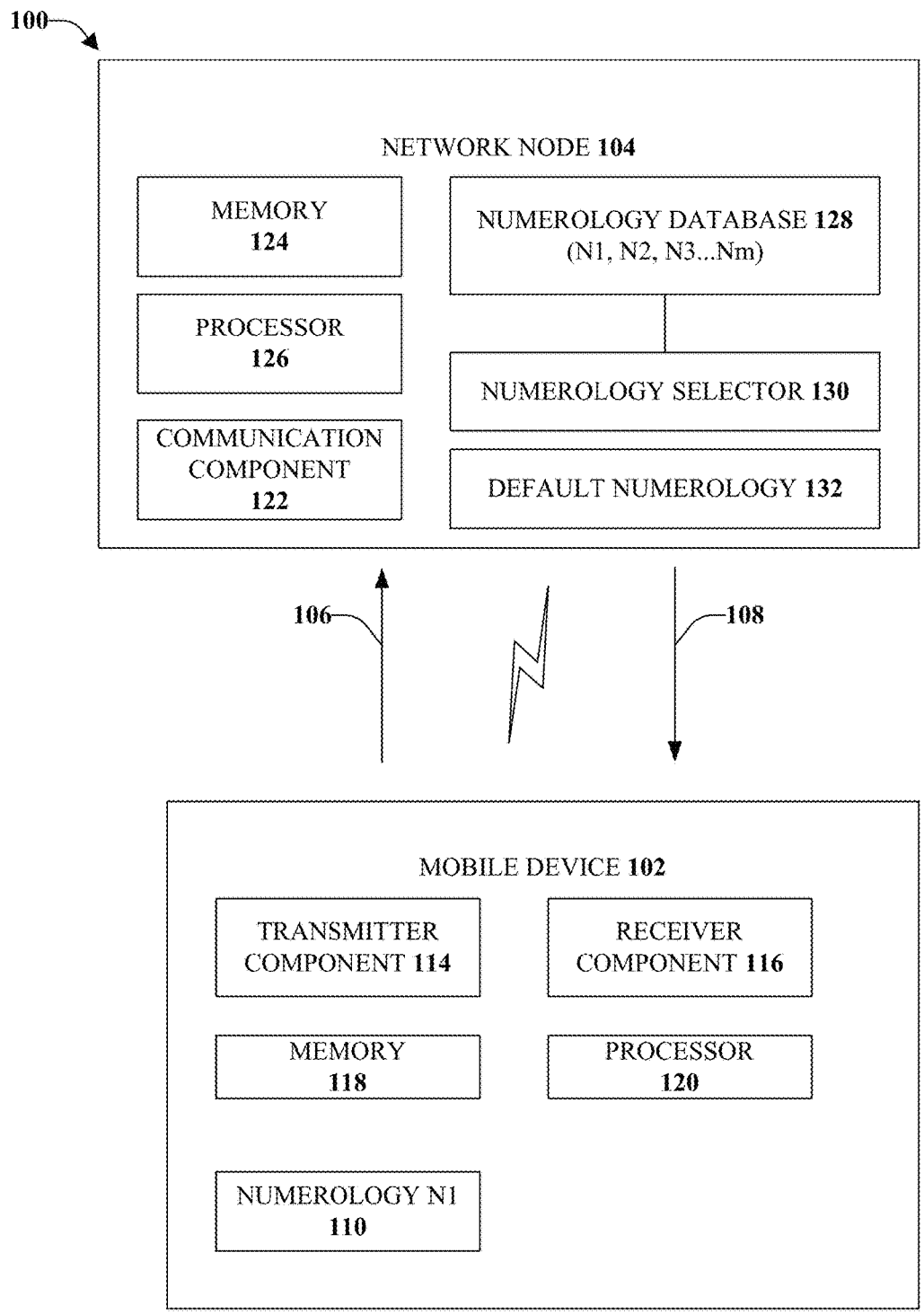
FIG. 1 illustrates an example, non-limiting wireless communications system in which the UE is capable of processing only one numerology, in accordance with one or more embodiments described herein.

Referring initially to FIG. 1 illustrated is an example, non-limiting wireless communications system 100 for facilitating an initial access between a mobile device (or UE) and a network node, in accordance with one or more embodiments described herein. As illustrated, a user equipment (UE) or mobile device 102 (e.g., mobile device or other terminology) can be in communication with a network node 104 (e.g., an eNodeB, eNB, network, cell or other terminology). Further, the mobile device 102 and/or the network node 104 can be in communication with other mobile devices (not shown) and/or other network nodes (not shown). A "link" is a communications channel that connects two or more devices or nodes. An uplink (UL 106) refers to a link used for transmission of signals from the mobile device 102 to the network node 104. A downlink (DL 108) refers to the link used for transmission of signals from the network node 104 to the mobile device 102. It is noted that although various aspects are discussed with respect to a single mobile device and a single network node, the various aspects discussed herein can be applied to one or more mobile devices and/or one or more network nodes.

The mobile device 102 can include a numerology component 110, a transmitter component 114, and a receiver component 116. Although illustrated and described with respect to separate components, the transmitter component 114 and the receiver component 116 can be a single transmitter/receiver configured to transmit to and/or receive data to/from the network node 104, other network nodes, and/or other Mobile devices. Through the transmitter component 114 and the receiver component 116, the mobile device 102 can concurrently transmit and receive data, the mobile device 102 can transmit and receive data at different times, or combinations thereof.

According to some implementations, the mobile device 102 can include a control circuit and the processor 120 and the memory 118 can be installed on the control circuit. Further, the processor 120 can be configured to execute a program code stored in the memory 118 to perform the various aspects discussed herein. For example, the processor 120 can execute the program code in memory 118 to perform initial access, which includes the steps of cell search and selection, receiving system information and executing random access procedure.

In the example shown in FIG. 1, the numerology component 110 contains only one numerology N1, which means that this particular mobile device 102 can accommodate (or process) only one numerology N1. In various embodiments, numerologies can be added or removed from the numerology component 110. Numerology refers to the particular values that are selected for parameters such as subcarrier spacing, symbol times, Fast Fourier Transform (FFT) sizes, etc. for performing orthogonal frequency division multiplexing (OFDM). That is the case in some Long Term Evolution (LTE) complaint mobile phones, wherein only one downlink (DL) numerology is defined for initial access. Specifically, the numerology is defined to include a 15 KHz subcarrier spacing and the signal and channel to be acquired during initial access are based on 15 KHz numerology. The OFDM symbols are grouped into resource blocks. If the resource blocks have a total size of 180 kHz spacing in the frequency domain, for example, then at 15 kHz sub-spacing there would be 12 subcarriers. In time domain, each resource block would have the length of 5 milliseconds and thus each 1 millisecond transmission time interval (TTI) would transmit two slots (Tslots) of OFDM symbols.

Figure 10:
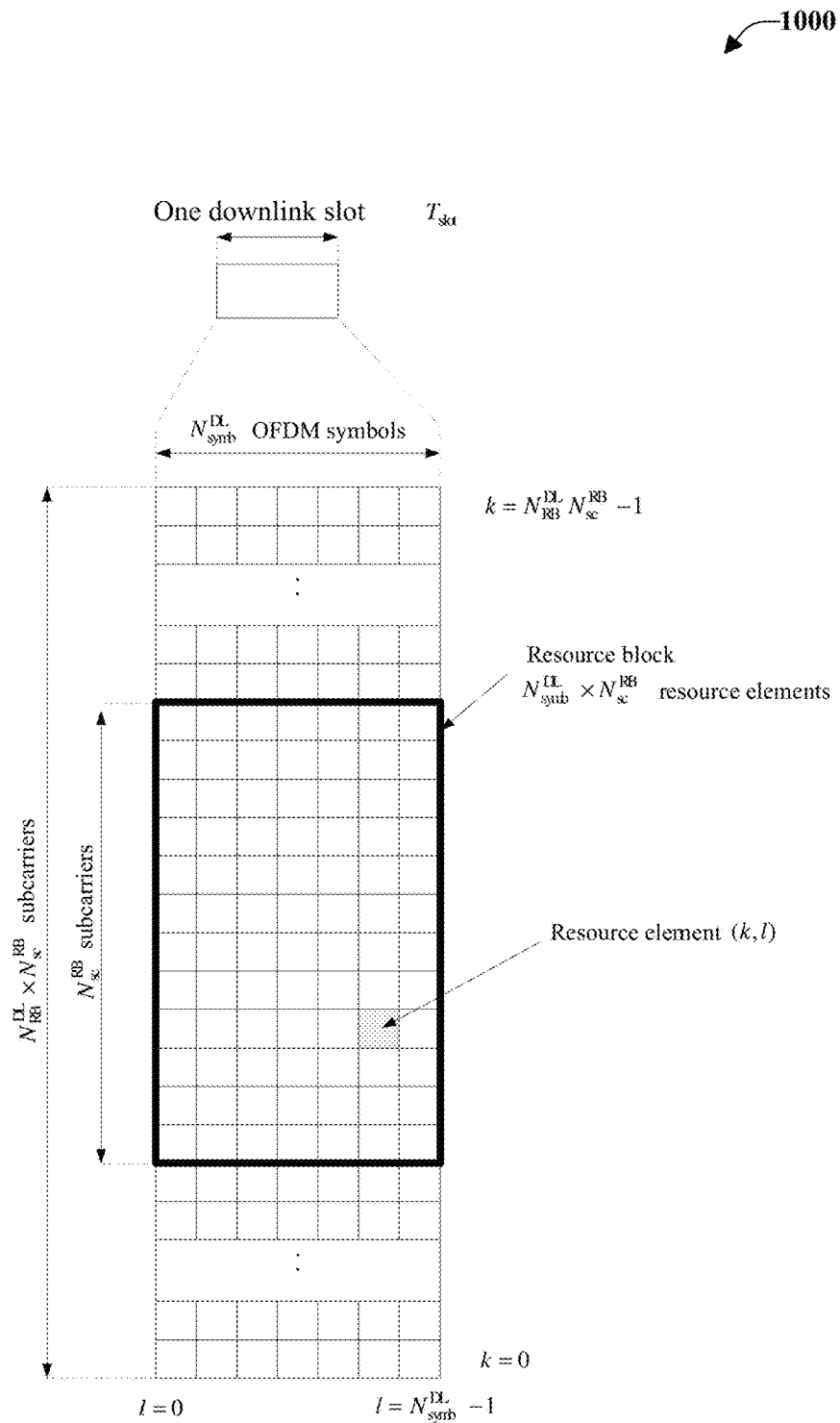
FIG. 10 illustrates an example, non-limiting downlink resource grid for OFDM transmission, in accordance with one or more embodiments described herein.

An overview of the LTE numerology and descriptions of the OFDM resource grid, the resource elements and the resource blocks are described in 3GPP TS 36.211 v13.1.10 ("E-ULTA Study on latency reduction techniques for LTE (Release 13)") in sections 6.1 and 6.2. 3GPP Ts 36.211 v13.1.10 is incorporated by reference here in its entirety and some portions are reproduced below and in FIG. 10.

Figure 6:
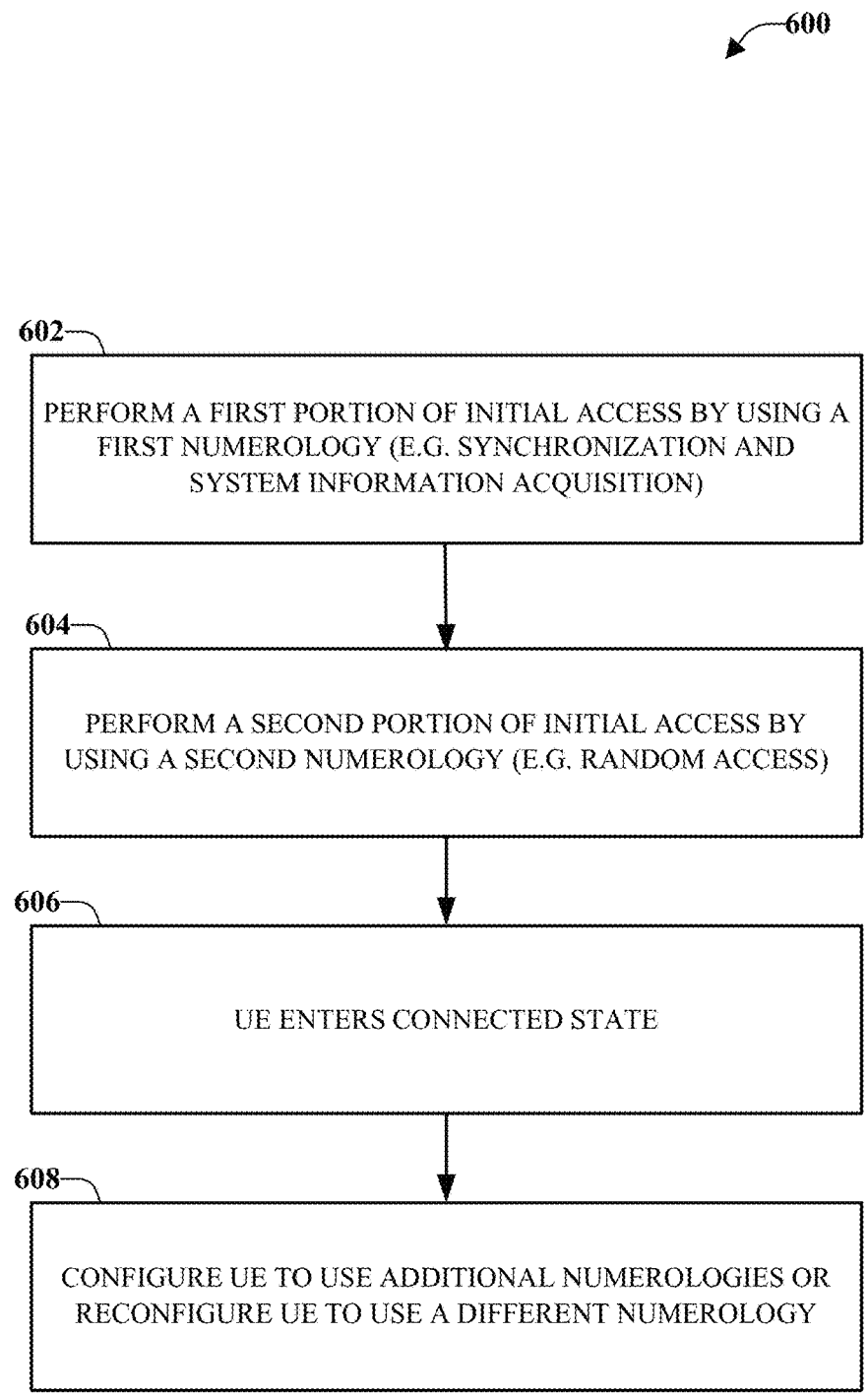
FIG. 6 illustrates an example, non-limiting methodology for facilitating an initial access by using different numerologies for different portions of the initial access process, in accordance with one or more embodiments described herein.

"6.2.1 Resource grid: The transmitted signal in each slot is described by one or several resource grids of $N_{RB}^{DL} N_{sc}^{RB}$ subcarriers and $N_{symb}^{DL}$ OFDM symbols. The resource grid structure is illustrated in FIG. 6.2.2-1. [Reproduced in FIG. 10] The quantity $N_{RB}^{DL}$ depends on the downlink transmission bandwidth configured in the cell and shall fulfill $$N_{RB}^{min,DL} \leq N_{RB}^{DL} \leq N_{RB}^{max,DL}$$

where $N_{RB}^{min,DL}=6$ and $N_{RB}^{max,DL}=110$ are the smallest and largest downlink bandwidths, respectively, supported by the current version of this specification.

The set of allowed values for N is given by 3GPP TS 36.104 [6]. The number of OFDM symbols in a slot depends on the cyclic prefix length and subcarrier spacing configured and is given in Table 6.2.3-1 [reproduced below].

An antenna port is defined such that the channel over which a symbol on the antenna port is conveyed can be inferred from the channel over which another symbol on the same antenna port is conveyed. For MBSFN [multicast-broadcast single-frequency network] reference signals, positioning reference signals, UE-specific reference signals associated with PDSCH [physical downlink shared channel] and demodulation reference signals associated with EPDCCH [enhanced physical downlink control channel], there are limits given below within which the channel can be inferred from one symbol to another symbol on the same antenna port. There is one resource grid per antenna port. The set of antenna ports supported depends on the reference signal configuration in the cell:

Cell-specific reference signals support a configuration of one, two, or four antenna ports and are transmitted on antenna ports p=0, p∈{0,1}, and p∈{0,1,2,3}, respectively.

MBSFN reference signals are transmitted on antenna port p=4. The channel over which a symbol on antenna port p=4 is conveyed can be inferred from the channel over which another symbol on the same antenna port is conveyed only if the two symbols correspond to subframes of the same MBSFN area.

UE-specific reference signals associated with PDSCH are transmitted on antenna port(s) p=5, p=7, p=8, or one or several of p∈{7,8,9,10,11,12,13,14}. The channel over which a symbol on one of these antenna ports is conveyed can be inferred from the channel over which another symbol on the same antenna port is conveyed only if the two symbols are within the same subframe and in the same PRG when PRB bundling is used or in the same PRB pair when PRB bundling is not used.

Demodulation reference signals associated with EPDCCH are transmitted on one or several of p∈{107,108, 109,110}. The channel over which a symbol on one of these antenna ports is conveyed can be inferred from the channel over which another symbol on the same antenna port is conveyed only if the two symbols are in the same PRB pair.

Positioning reference signals are transmitted on antenna port p=6. The channel over which a symbol on antenna port p=6 is conveyed can be inferred from the channel over which another symbol on the same antenna port is conveyed only within one positioning reference signal occasion consisting of $N_{PRS}$ consecutive downlink subframes, where $N_{PRS}$ is configured by higher layers.

CSI reference signals support a configuration of one, two, four, eight, twelve, or sixteen antenna ports and are transmitted on antenna ports p=15, p=15,16, p=15, . . . , 18, p=15, . . . , 22, p=15, . . . , 26 and p=15, . . . , 30, respectively.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay."

"6.2.2 Resource elements: Each element in the resource grid for antenna port p is called a resource element and is uniquely identified by the index pair (k,l) in a slot where k=0, . . . , $N_{RB}^{DL}N_{sc}^{RB}-1$ and l=0, . . . , $N_{symb}^{DL}-1$ are the indices in the frequency and time domains, respectively. Resource element (k,l) on antenna port p corresponds to the complex value $a_{k,l}^{(p)}$. When there is no risk for confusion, or no particular antenna port is specified, the index p may be dropped." [See FIG. 10].

"6.2.3 Resource blocks: Resource blocks are used to describe the mapping of certain physical channels to resource elements. Physical and virtual resource blocks are defined.

A physical resource block is defined as $N_{symb}^{DL}$ consecutive OFDM symbols in the time domain and $N_{sc}^{RB}$ consecutive subcarriers in the frequency domain, where $N_{symb}^{DL}$ and $N_{sc}^{RB}$ are given by Table 6.2.3-1. A physical resource block thus consists of $N_{symb}^{DL} \times N_{sc}^{RB}$ resource elements, corresponding to one slot in the time domain and 180 kHz in the frequency domain.

Physical resource blocks are numbered from 0 to $N_{RB}^{DL}-1$ in the frequency domain. The relation between the physical resource block number $n_{PRB}$ in the frequency domain and resource elements (k,l) in a slot is given by $$n_{PRB} = \left\lfloor \frac{k}{N_{sc}^{RB}} \right\rfloor$$

TABLE 6.2.3-1

Physical resource blocks parameters

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

A physical resource-block pair is defined as the two physical resource blocks in one subframe having the same physical resource-block number $n_{PRB}$.

A virtual resource block is of the same size as a physical resource block. Two types of virtual resource blocks are defined:

Virtual resource blocks of localized type

Virtual resource blocks of distributed type

For each type of virtual resource blocks, a pair of virtual resource blocks over two slots in a subframe is assigned together by a single virtual resource block number, $V_{RRB}$."

In implementation examples where the UE 102 can accommodate only one numerology (e.g. N1), the initial access process for the UE 102 can be as follows. To access a cell (e.g. 104), the UE 102 would need to acquire some fundamental information. For example, UE 102 would first acquire time/frequency synchronization information about the cell 104, which is done during cell search or cell selection/reselection portion of the initial access.

The time/frequency synchronization information can be obtained by receiving a synchronization signal, such as the primary synchronization signal (PSS) or the secondary synchronization signal (SSS). During synchronization, the center frequency information about the cell 104 and the subframe/frame boundary information about the cell 104 are obtained by the UE 102. Also, cyclic prefix (CP) of the cell 104, e.g. normal CP or extended CP, duplex mode of the cell 104, e.g. FDD or TDD can be known/learned from the PSS/SSS. Also, the master information block (MIB), which is carried on/provided by the physical broadcast channel (PBCH), includes some fundamental system information about the cell 104, for example, system frame number (SFN), system bandwidth, physical control channel (PH-ICH/PDCCH) and related information. Moreover, the UE 102 can then acquire some more system information required to access the cell in the system information block (SIB), such as whether the cell 104 can be accessed, uplink (UL) bandwidth and frequency, random access parameter(s), and so on.

The UE 102 can then perform random access and request connection to the cell 104. After the connection set up is complete, UE 102 would enter a connected mode and be able to perform data transmission to the cell 104 or perform data reception from the cell 104. In some example implementations, a UE 102 that is in an idle mode can set up a connection with the cell 104 if and upon receiving a page from the cell 104. The UE 102 may or may not have up to date system information. If the UE 102 does have up to date system information, the UE 102 can directly perform random access to set up the connection. If the UE 102 does not have up to date information, the UE 102 will need to acquire the system information first and then perform the random access to set up the connection. 3GPP's desired procedures of a UE's idle mode for 5G are mentioned in the publication 3GPP TS 36.304, v13.2.0 Release 13, entitled "Evolved Universal Terrestrial Radio Access (E-ULTRA); User Equipment (UE) procedure in idle mode (Release 13)". That publication is incorporated by reference in its entirety herein.

The network node 104 can include a communication component 122 that can be a transmitter/receiver configured to transmit to and/or receive data from the mobile device 102, other network nodes, and/or other mobile devices. Through the communication component 122, the network node 104 can concurrently transmit and receive data, the network node 104 can transmit and receive data at different times, or combinations thereof. The network node 104 can also comprise a memory 124 operatively coupled to a processor 126. The memory 124 can facilitate action to control communication between the network node 104 and the mobile device 102, for example, communication related to initial access, such that the non-limiting communications system 100 can employ stored protocols and/or algorithms to achieve improved communications in a wireless network as described herein.

The network node 104 includes a numerology database (or library) 128, a numerology selector module 130 communicably and/or controllably coupled to the numerology database 128, and a default numerology module 132. In one example, a default numerology stored in the default numerology module 132 is automatically used for performing an operation with the UE 102 (e.g. initial access, paging or connected state transmission) unless and until a determination is made to use a different numerology. In one example, the determination about whether or not to use the default numerology stored in the default numerology module 132 is made before commencing an operation (e.g. initial access, paging or connected state transmission). In one example, if a determination is made not to use the default numerology, then the numerology selector module 130 is tasked with selecting one or more desired numerologies from the numerology database 128. The numerology database 128 includes numerologies N1-Nm that the cell 104 can process. In one embodiment, one of the numerologies N1-Nm is the default numerology. In one embodiment, one the numerologies N1-Nm is the cell's 104 preferred numerology. In one embodiment, numerologies can be added or removed from the numerology database 128. The numerology selector 130 is tasked with selecting a proper numerology for performing initial access communication with the mobile device 102. In one example, the numerology selector module 130 is tasked with selecting a proper numerology when a determination is made that a numerology different from the numerology stored in the default numerology module 132 is desired. In one example, the numerology selector module 130 is programmed to select one or more numerologies from the numerology database 128 for certain tasks and revert control back to the default numerology module 132 for other tasks. In an example with respect to FIG. 1, wherein because the mobile device 102 is capable of processing only one numerology at a given time, e.g. N1 or N2, the numerology selector 130 may use N1 for the initial access and may select one of N1 and N2 for the data transmission/reception that will occur between the cell 104 and the mobile device 102 after the mobile device 102 enters a connected mode. The numerology selector 130 is programmed to identify the numerology (e.g. N1) that the mobile device 102 is capable of processing and select that numerology for initial access and connected state operation.

Figure 2:
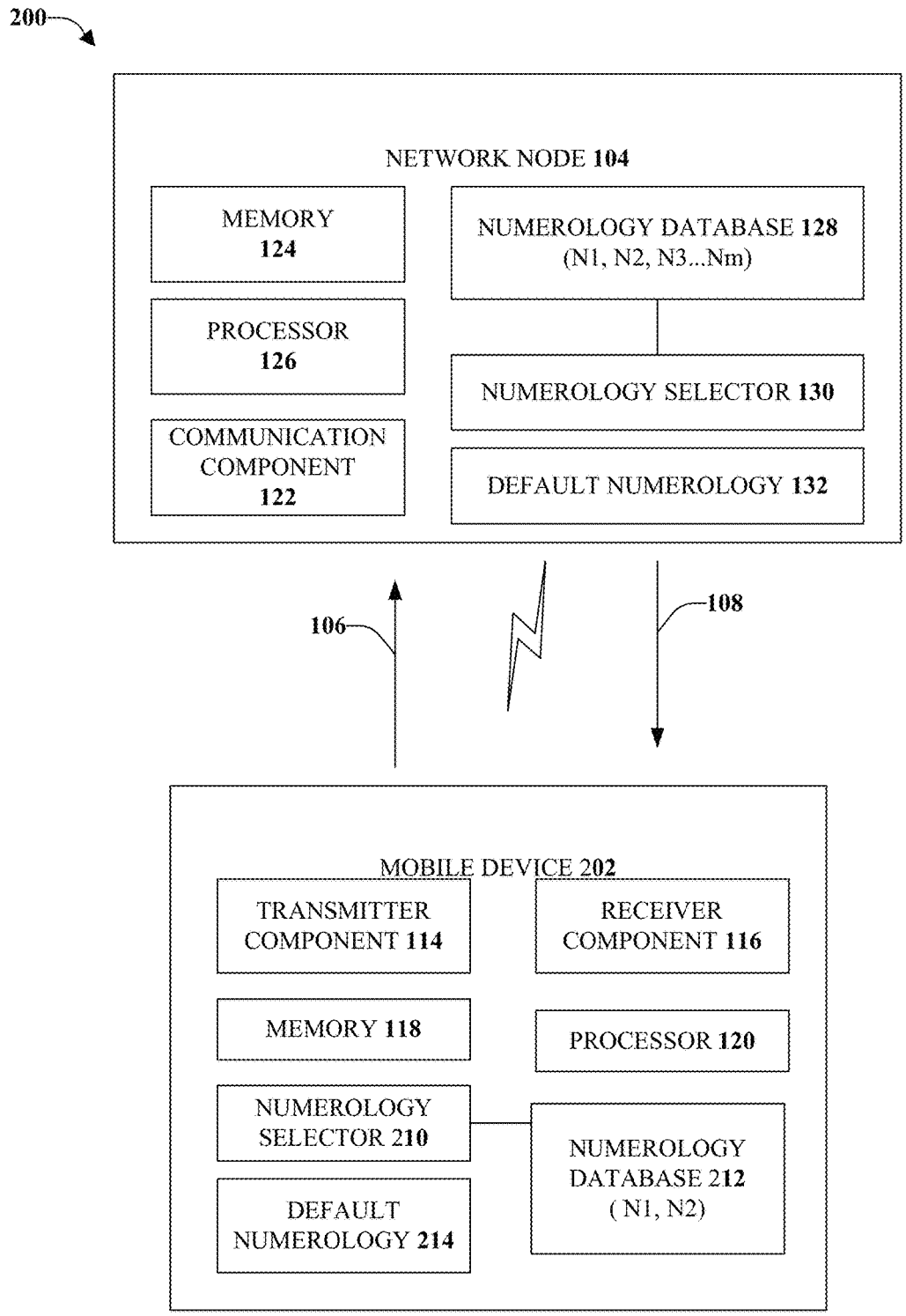
FIG. 2 illustrates an example, non-limiting wireless communications system in which the UE is capable of processing multiple numerologies, in accordance with one or more embodiments described herein.

FIG. 2 illustrates an example, non-limiting communications system 200 in which both the network node 104 and the mobile device 202 are capable of processing multiple numerologies, in accordance with one or more embodiments described herein. As illustrated, the numerology database 212 of the mobile device 102 can accommodate two numerologies at the same time, namely N1 and N2. The numerology database 212 and the numerology database 128 have two numerologies in common (N1 and N2). Thus in the example implementation illustrated in FIG. 2, the numerologies that the mobile device 202 can process are a subset of the numerologies offered by the cell 104. It is to be appreciated that in alternate example embodiments, the numerology database 212 may contain one or more numerologies that are not available in the numerology database 128.

In one embodiment, the UE 202 automatically uses the numerology stored in the default numerology module 214 when it powers on, is paged and/or is operating in a connected mode. In one embodiment, the default numerology module 214 stores more than one default numerology. In one embodiment, wherein the mobile device 202 and the cell 104 are communicating with each other by using multiple numerologies simultaneously, one numerology is provided by the default numerology module 214 and the other numerology/numerologies is/are selected by the numerology selector module 210 from the numerology database 212. In one example, the numerology selector module 210 is tasked with selecting a desired numerology from the numerology database 212 when it is determined that a different numerology from the numerology stored in the default numerology module 214 is needed or desired. In one embodiment, it is determined at the onset of an operation whether a default numerology stored in the default numerology module should be used for the operation or the numerology selector module 210 should select one or more numerologies from the database 212. In one embodiment, the numerology selector module 210, which is communicably and/or controllably coupled to the numerology database 212, selects one of N1 or N2 as the mobile device's 202 preferred numerology. In some embodiments, numerologies can be added or removed from the database 212 and the default numerology module 214. In some embodiments, numerologies can be added or removed from the database 212 or the default numerology module 214 by way of the network node 104 or the mobile device 202. In one embodiment, the numerology selector 130 selects one of N1 or N2 for initial access communication based on the preference of the mobile device 202. In one embodiment, the numerology selector 130 selects one of N1 or N2 for initial access based on the preference of the cell 104. In one embodiment, the numerology selector 130 selects N1, N2, or both N1 and N2 for the data transmission/reception.

Figure 3:
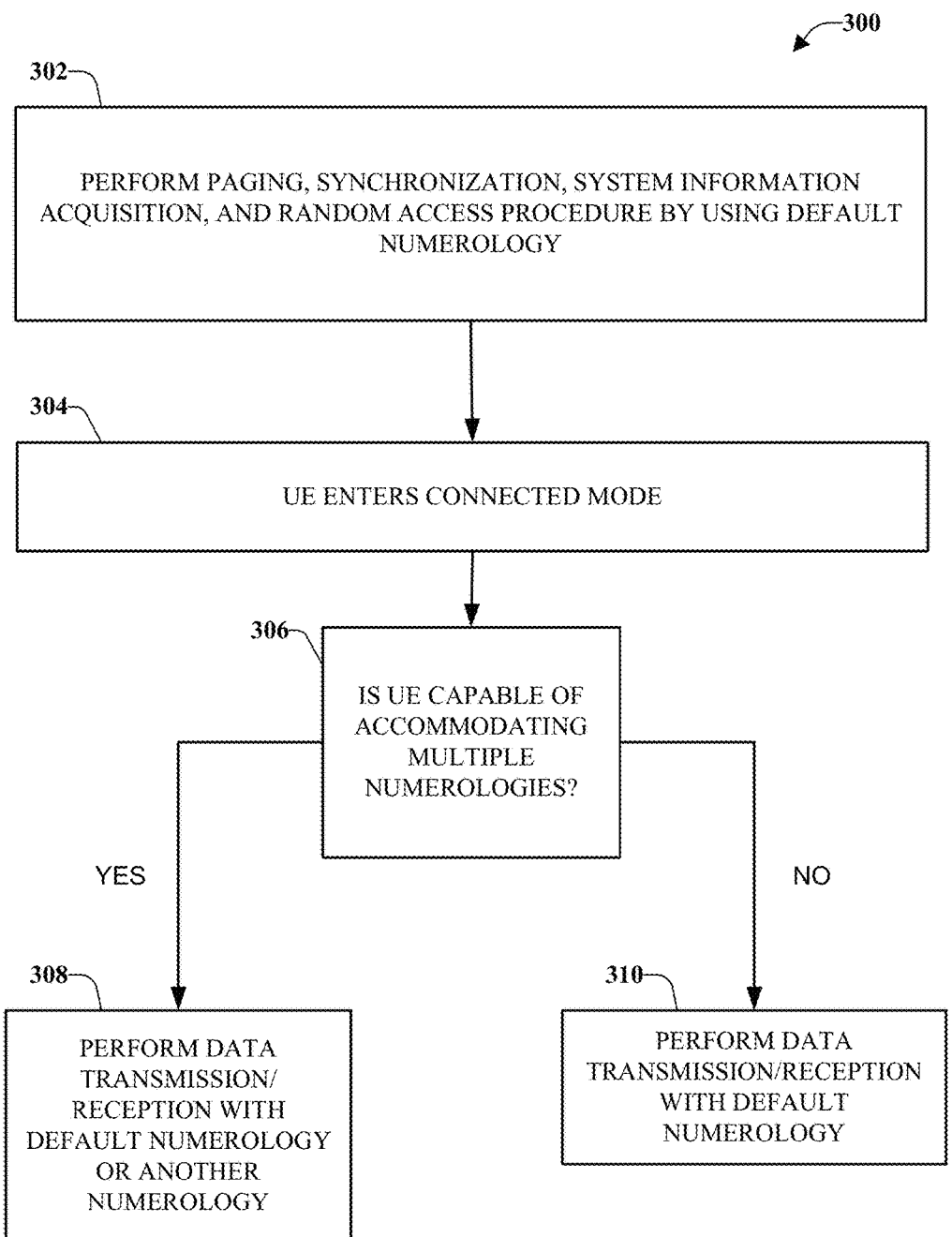
FIG. 3 illustrates an example, non-limiting methodology for facilitating an initial access by using a default numerology, in accordance with one or more embodiments described herein.

FIG. 3 illustrates an example, non-limiting methodology for performing initial access and connected mode data transmission/reception, in accordance with one or more embodiments described herein. As illustrated in the flow diagram 300, at Step 302, a default numerology that the cell offers and which the UE is capable of handling is used to perform the initial access process including paging, synchronization, system information acquisition. In one embodiment, a given/selected numerology is used to perform random access. In another embodiment, the default numerology is used to perform random access. In some embodiments, where the initial access is triggered by a page from a cell to a UE that is in idle mode, synchronization and system information gathering are not performed if the UE already has that information. Rather, the UE would directly perform random access upon receiving the page from the cell.

Figure 11:
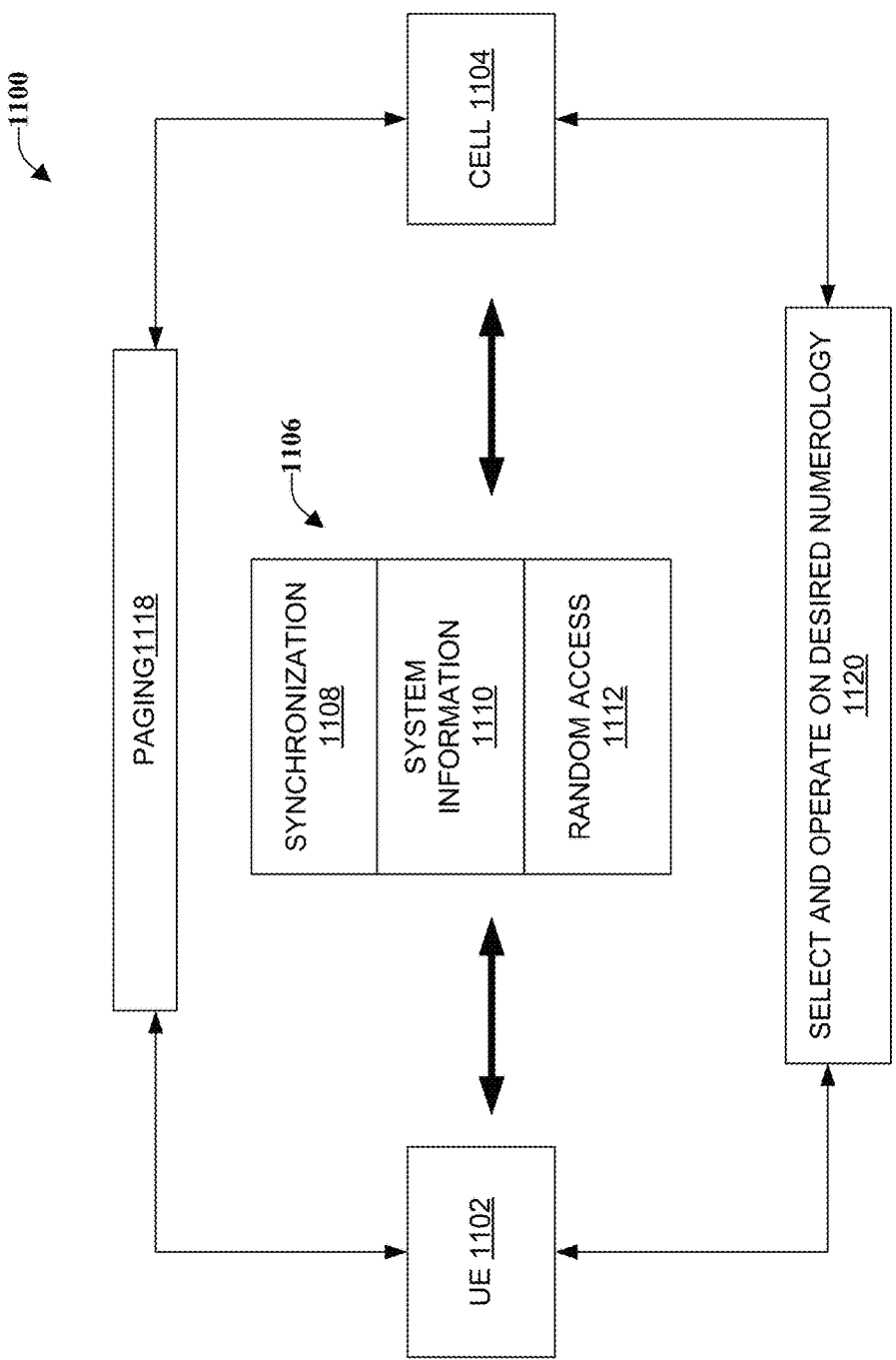
FIG. 11 illustrates an example, non-limiting block components of the initial access, in accordance with one or more embodiments described herein.

FIG. 11 illustrates an example, non-limiting methodology 1100 for bringing a UE into a connected mode, in accordance with one or more embodiments described herein. The initial access process 1106 is a component of the methodology 1100. In one embodiment, the initial access process 1106 is triggered when the UE 1102 powers on. In one embodiment, the initial access process 1106 is triggered when the UE 1102, which is in an idle mode, is paged 1118 by the cell/network/TRP 1104. The initial access process 1106 itself is divided into three portions, namely synchronization 1108, system information (SI) acquisition 1110 and random access procedure 1112. Synchronization 1108 occurs when the UE 1102 is searching for and selecting a cell (e.g. 1104) to camp on. The UE 1102 receives synchronization and reference signals from the cell 1104. In SI acquisition 1110, the UE 1102 receives information from the cell 1104 that allows the UE 1102 to learn about the cell's 1104 parameters and properties including, for example, the cell's 1104 default numerology, preferred numerology and/or the various numerologies offered by the cell 1104. Random access 1112 refers to a two-way communication between the UE 1102 and the cell 1104 for establishing communication channels etc. When the UE 1102 is attempting initial access upon waking up from an idle mode, it may skip the synchronization 1108 and SI acquisition 1110 steps because it already possesses that information. In that case, the UE 1102 can directly go to the random access step 1112. Upon completion of the random access procedure 1112, the UE 1102 enters into a connected mode of operation with the cell 1104 and commences data transmission/reception with the cell 1104. The selection of a desired numerology 1120 can occur both during initial access and connected mode, as discussed below in detail.

Referring again to Step 302 of FIG. 3, synchronization and system information gathering can provide the UE with valuable/important information about the cell's default numerology. At Step 304, upon completion of the initial access process, the UE enters into the connected mode of operation. At Step 306, the cell determines whether or not the UE can accommodate multiple numerologies. If the cell determines that the UE can accommodate multiple numerologies, then at Step 308, then the UE and the cell perform data transmission/reception with either the default numerology or any other numerology that the UE is capable of handling. The proper numerology can be determined based on the communication requirements. In one embodiment, a larger spacing is selected because a more accurate timing alignment is desired and a higher frequency error tolerance during transition is available. In one embodiment, the UE selects the numerology that meets its strictest requirement for service. If the cell determines that the UE can accommodate only one numerology, namely the default numerology, then at Step 310 the UE and the cell perform data transmission/reception by using the default numerology.

It is to be appreciated that in generating multiple numerologies, numerology can be adjusted such that reducing or increasing the number of OFDM symbols packed in a TTI is not the only tool to change the TTI's length. By way of example, a typical LTE numerology comprises transmission of 14 OFDM symbols in 1 milliseconds and a subcarrier spacing of 15 KHz. If the subcarrier spacing is adjusted to 30 KHz, under the assumption of that the FFT size and the CP structure remain the same, there would now be 28 OFDM symbols transmitted 1 ms, and equivalently the TTI length would effectively become 0.5 ms, if the number of OFDM symbols in a TTI is kept the same. Thus the different TTI lengths can effectively be made to be the same by scaling the subcarrier spacing. It is to be understood, however, that there would always be trade-off for the subcarrier spacing selection, e.g. FFT size, definition/number of physical resource blocks (PRB), the design of cyclic prefix (CP), supportable system bandwidth, and the like. The 3GPP is in the process of studying various ways of generating numerology families By way of example, based on meeting notes published by the 3GPP, 3GPP is considering numerology families, wherein each family is related to a base subcarrier spacing (e.g. 15 kHz, 17.5 kHz, 17.06 kHz or 21.33 kHz), and different values of subcarrier spacing are derived by multiplying the base subcarrier spacing with an integer N. Also, by way of example, the 3GPP is considering numerology families that are derived by raising a base subcarrier frequency by a power of 2 or another number.

Figure 4:
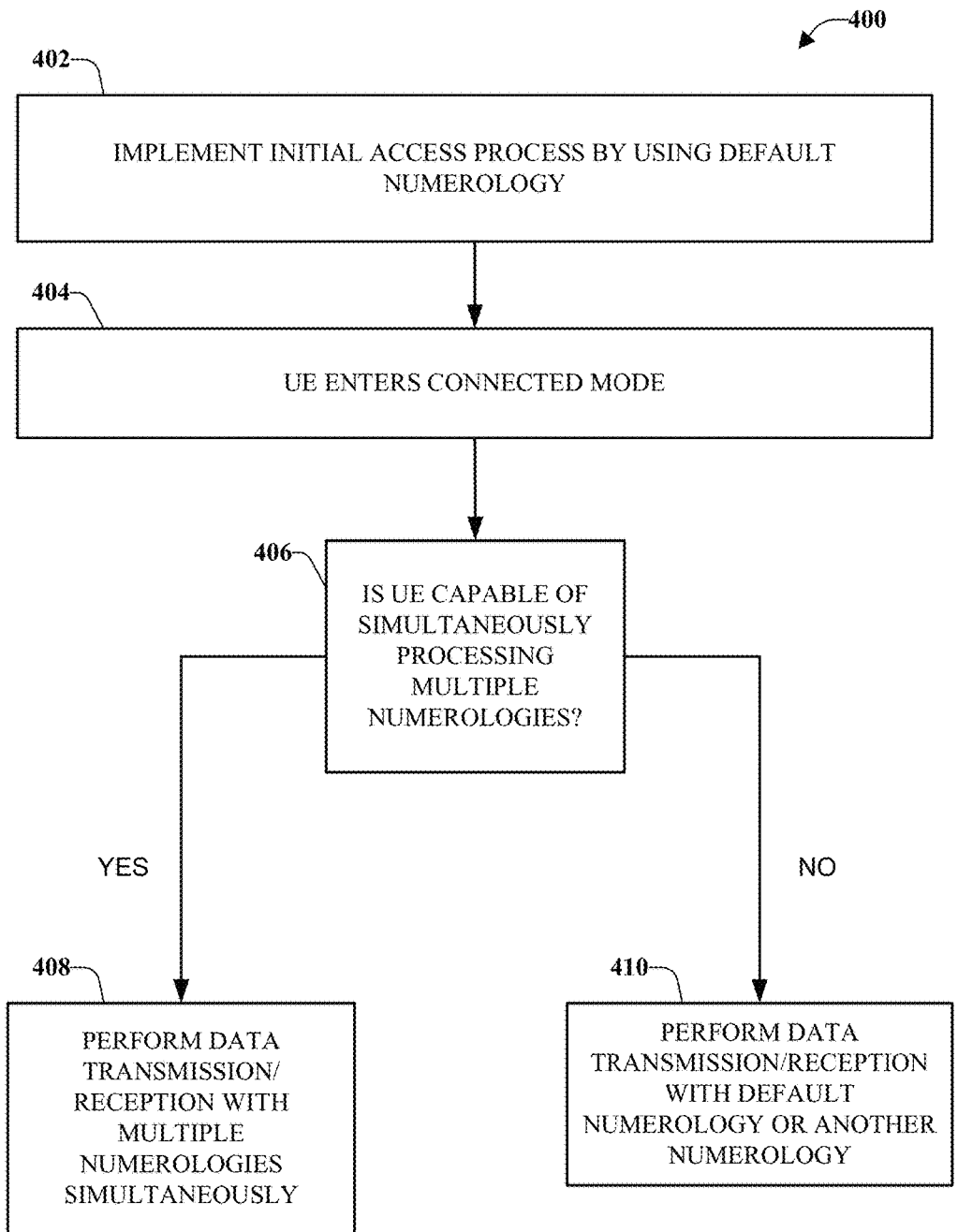
FIG. 4 illustrates an example, non-limiting methodology for facilitating an initial access by using a default numerology and then facilitating data transmission/reception by using multiple numerologies simultaneously, in accordance with one or more embodiments described herein.

FIG. 4 illustrates another example, non-limiting methodology for performing initial access communication and connected mode communication. As illustrated in flow diagram 400, at Step 402, a UE gains an initial access to a cell by using the UE's default numerology, which is among the numerologies offered by the cell. At Step 404, upon completing the initial access process, the UE enters the connected mode of operation. At Step 406, the cell determines whether or not the UE is capable of processing multiple numerologies simultaneously. If the cell determines that the UE is capable of handling multiple numerologies simultaneously, then at Step 408 the cell and the UE transmit/receive data by simultaneously using multiple numerologies. If the cell determines that the UE is not capable of handling multiple numerologies simultaneously, then at Step 410 the cell and UE perform the connected mode operations (e.g. data transmission/reception) with either the default numerology or another numerology that is acceptable to the UE.

Figure 5:
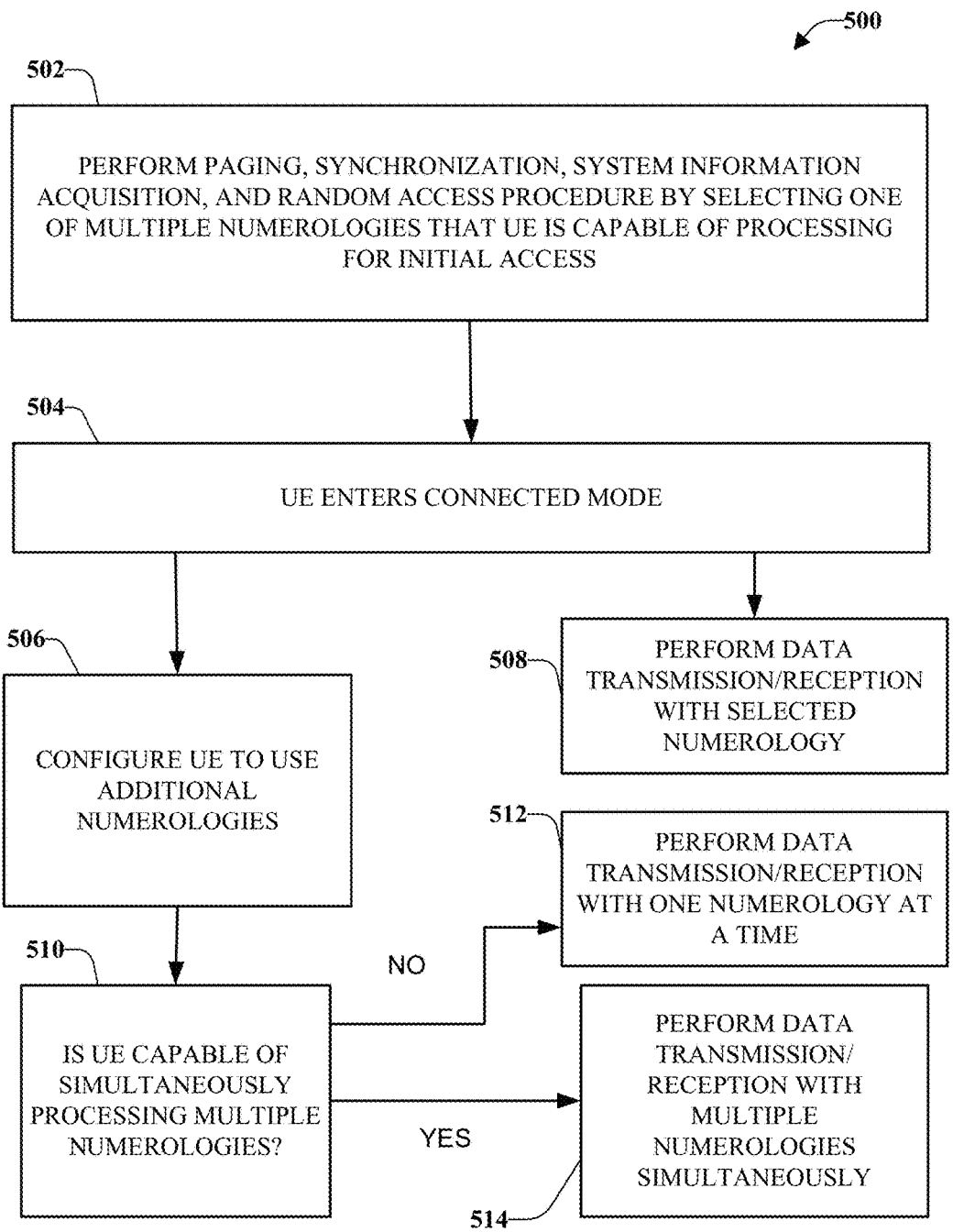
FIG. 5 illustrates an example, non-limiting methodology for facilitating an initial access by using any one of the many numerologies that the UE is capable of processing, in accordance with one or more embodiments described herein.

FIG. 5 illustrates yet another example, non-limiting methodology for performing initial access communication and connected mode communication. As illustrated in the flow diagram 500, at Step 502, the UE and the cell perform various portions of the initial access process including paging, synchronization, system information acquisition and random access procedure by using one of multiple numerologies that the UE is capable of processing. In some embodiments, the synchronization and system information acquisition need not be performed, for example, if the UE is merely waking up from its idle mode in response to a page and already possesses the synchronization and system acquisition information. In that case, the UE may perform random access immediately upon receiving the page from the cell. The numerology can be selected based on subcarrier spacing that is needed to trigger the initial access in a desired manner (e.g. immediately or delayed). The numerology can be selected based on a priority criterion, for example larger subcarrier spacing is preferred over smaller subcarrier spacing or vice versa).

At Step 504, the UE enter the connected mode of operation. At Step 506, the cell configures the UE to use additional numerologies. Alternatively, at Step 508, the UE and the cell can continue to use the same numerology that was used for initial access for connected mode data transmission/reception. If the UE is configured to use additional numerologies at Step 506, then at Step 510 the cell determines whether or not the UE is capable of simultaneously processing multiple numerologies. If the cell determines that the UE cannot simultaneously handle multiple numerologies, then at Step 512 the UE and the cell transmit/receive data by using one numerology at a time. However, if the cell determines that the UE can simultaneously handle multiple numerologies, then at Step 514 the UE and the cell transmit/receive data by simultaneously using multiple numerologies.

FIG. 6 illustrates an example, non-limiting methodology for performing initial access with multiple numerologies. In this methodology the initial access process in divided into multiple portions and different numerologies are used to perform different portions of the initial access. As illustrated in flow diagram 600, at Step 602 the UE performs a first portion of the initial access process by using a first numerology. In one embodiment, the first portion of the initial access process includes synchronization with the cell. In one embodiment, the first portion includes both synchronization and system information acquisition. In one embodiment, the first numerology includes the UE's default or preferred numerology. In one embodiment, the first numerology includes any one of the numerous numerologies offered by the cell that the UE has the capability to process.

At Step 604, the UE performs a second portion of the initial access by using a second numerology that is different from the first numerology. The second portion can include, for example, random access. The second numerology can be selected by the cell or the UE. At Step 606, the UE enters into a connected state. At Step 608, the cell configures the UE to use additional numerologies or reconfigures the UE to use a different numerology from the first and second numerologies.

Figure 7:
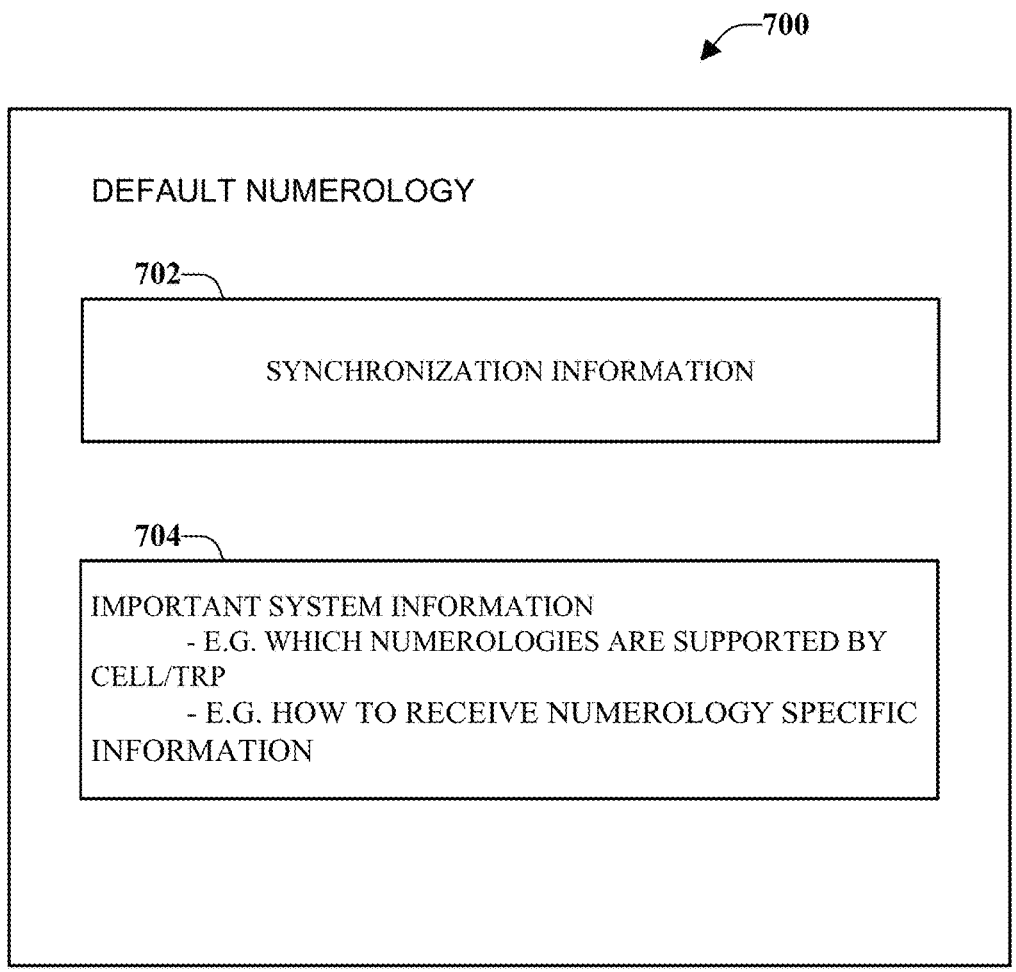
FIG. 7 illustrates an example, non-limiting schematic diagram of the information contained in the default numerology, in accordance with one or more embodiments described herein.

FIG. 7 illustrates an example schematic diagram of a default numerology. The default numerology 700 is shown to contain synchronization information 702 for initial access and important system information 704. Secondary system information specifically for a numerology would be transmitted on the numerology itself. The important system information 704 can include identification of the numerologies that are supported by the cell or a particular transmission/reception point of the cell. The important system information 704 can also identify which numerologies of the multiple numerologies supported by the cell provide system information. The important system information 704 can be common for all numerologies. In some example implementations, it is possible that not all cell supported numerologies provide numerology specific system information. System information for some numerologies may be provided by dedicated signaling after the UE enters radio resource control (RRC) connected mode. In some example implementations, the important system information on the default numerology indicates how to receive numerology specific system information for another numerology. The secondary system information can include, for example, a random access parameter for a particular numerology or scheduling information. The common system information can include information that is common to all numerologies, for example, common control channel for random access information or the common baseline from which the cell created various numerologies.

Figure 8:
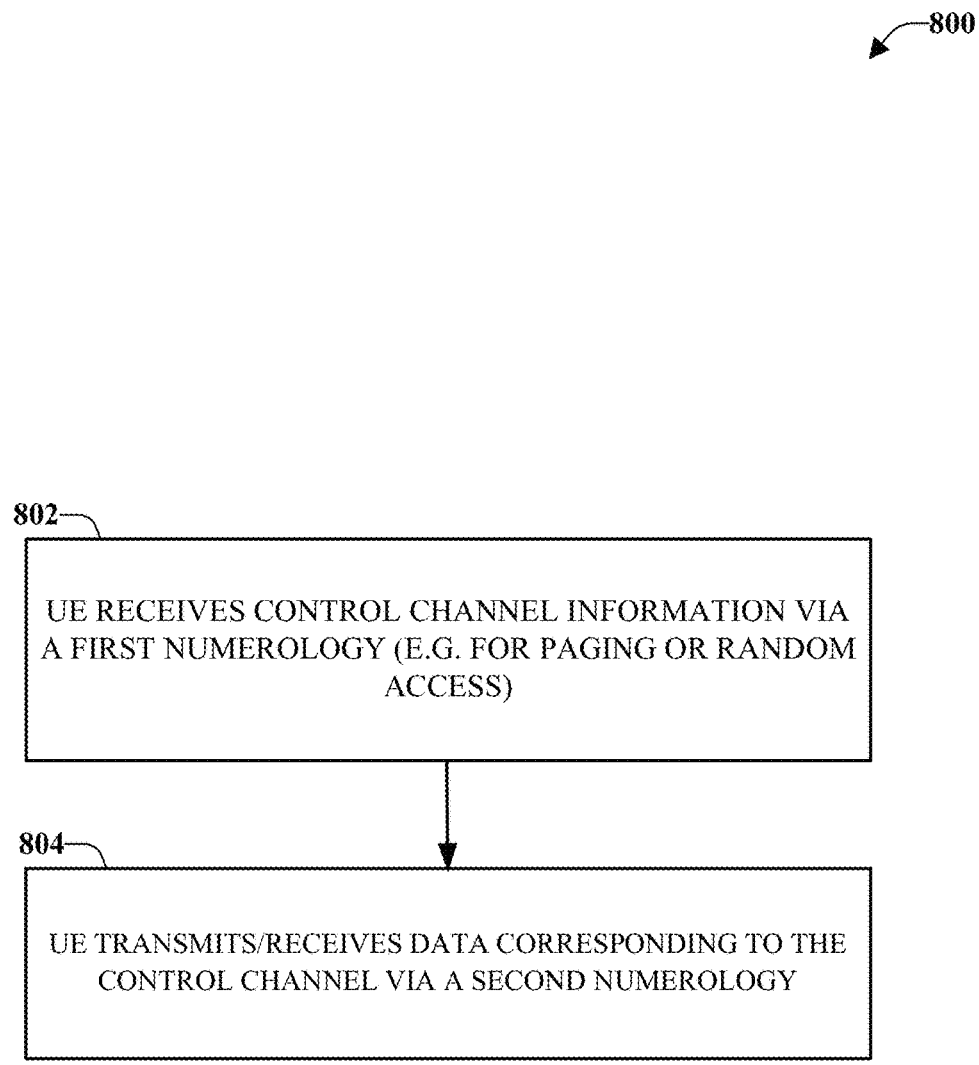
FIG. 8 illustrates an example, non-limiting methodology for using different numerologies, in accordance with one or more embodiments described herein.

FIG. 8 illustrates an example, non-limiting method for using numerologies. As illustrated in flow diagram 800, at Step 802 a UE receives control channel information from a cell by way of a first numerology. The control channel information can relate to, for example, paging or random access. At Step 804, the UE transmits/receives data corresponding to the control channel by way of a second numerology that is different from the first numerology. One example of the control channel mentioned in Step 802 is for paging. The UE receives a control channel for paging on a resource common for all numerologies by way of the default (or first) numerology, at Step 802. The paging control channel identifies the corresponding data channel of the second/separate/selected numerology mentioned in Step 804. Specifically, the selection of the second numerology is according to an indication in the control channel received by way of the first numerology. In other words, the control channel and the corresponding data channel use different numerologies.

Another example of the control channel mentioned in Step 802 is for system information. In the example, the UE receives a control channel for system information on a resource common for all numerologies by way of the default numerology. According to the received control channel for system information (Step 802), the UE receives the corresponding data channel on a separate/selected numerology (Step 804). More specifically, the selection of the data channel is according to an indication in the corresponding control channel. Yet another example of the control channel is for random access. In this example, UE receives control channel for random access on a resource common for all numerologies on the default (or first) numerology (Step 802). According to the received control channel for random access in Step 802, the UE receives the corresponding data channel on a second/separate/selected numerology (Step 804). More specifically, the selection of the data channel is according to an indication in the corresponding control channel.

Figure 9:
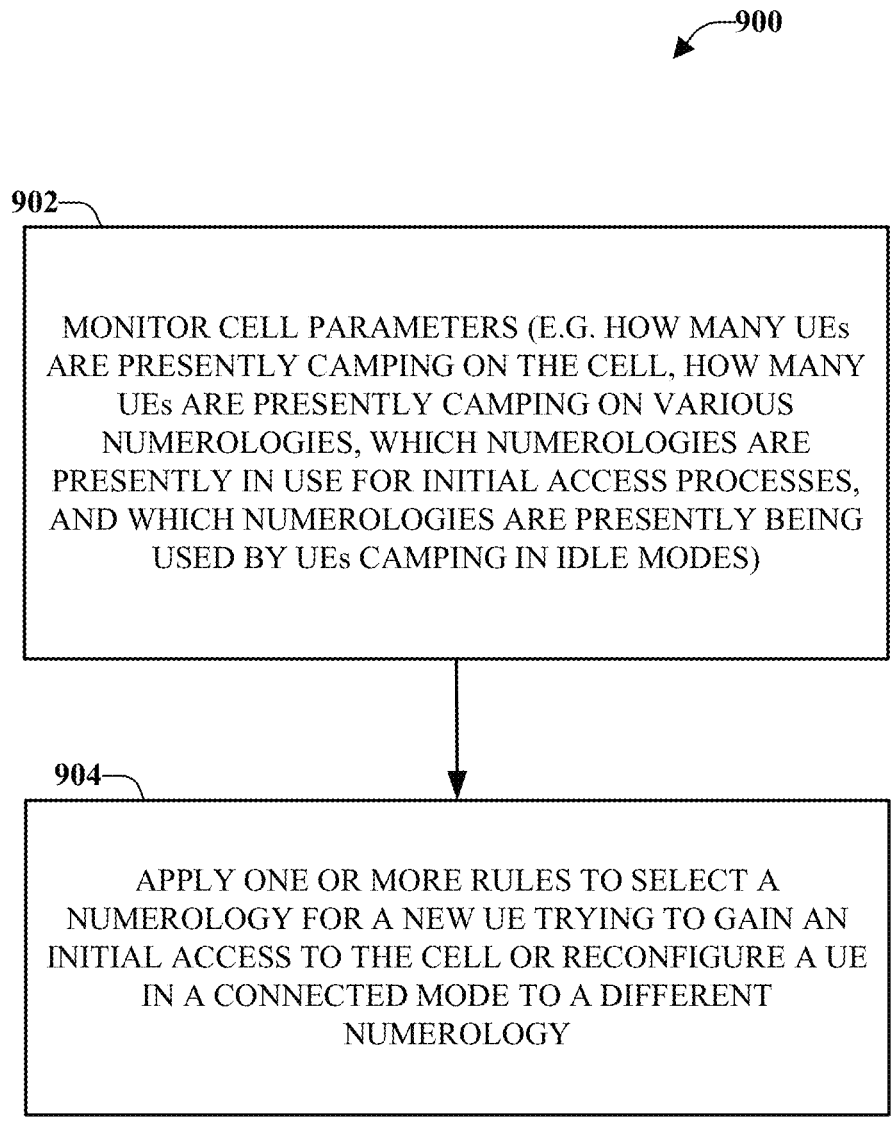
FIG. 9 illustrates an example, non-limiting methodology for selecting a numerology, in accordance with one or more embodiments described herein.

FIG. 9 illustrates an example, non-limiting methodology for selecting a numerology. As illustrated in flow diagram 900, at Step 902 a cell monitors it parameters and load sharing by its various numerologies including, for example, how many UEs are presently camping on the cell, how many UEs are presently camping on various numerologies, which numerologies are presently being used for performing initial accesses by various UEs, and which numerologies are presently being used by UEs camping in idle modes. Based on the evaluation of the above parameters and load sharing information about the various numerologies offered by the cell, at Step 904, one or more rules are applied to select a numerology for a new UE that is trying to gain an initial access to the cell or to reconfigure a UE that is in a connected mode with the cell to a different numerology.

According to one example rule, connected mode operation can be performed with a any numerology having a higher subcarrier spacing than the numerology that was used for initial access. According to another example rule, connected mode operation can be performed with a any numerology having a smaller subcarrier spacing than the numerology that was used for initial access. According to one example rule, cell searching during initial access is performed using a sequence of numerologies, for example, with increasing or decreasing subcarrier spacing. Cell search is a procedure by which a UE acquires time and frequency synchronization with a cell. According to one example rule, only a certain number of UEs are allowed to access a particular numerology. According to one example rule, only a certain number of UEs are allowed to camp on a given cell. According to one example rule, common resources needed for numerologies are scheduled up or down according to the expectations, and thus avoiding or reducing the redistribution of idle mode UEs to different numerologies.

According to one example rule, when a UE camps on a given cell with a particular numerology, the eNB (evolved node B) does not grant an initial access on that numerology to another UE, if initial access is available on another numerology. In some example implementations, the cell may change numerology for an already camping UE in order to offer a desired numerology to a UE that is trying to gain initial access. The cell may accomplish that by paging/system information change or the UE may accomplish that by autonomous cell reselection (with potential numerology sequence). According to one example rule, if multiple numerologies are left/available for initial access, the cell will try to distribute the numerologies evenly so that the load sharing of the numerologies is as equally distributed as much as possible.

In one example implementation, numerology change can be done on a per transmission time interval (TTI) basis. In one example, the numerology may be done on a per symbol basis. In one example, there may be an interruption time when numerology is changed, and UE may not be able to perform reception for certain period. In one example implementation, when numerology changes, time/frequency synchronization may be adjusted according to time/frequency error for a given numerology. In one example, when numerology changes, eNB may signal/send a timing advance (TA) command to the UE to adjust/fine-tune/delay the timing of next communication. In one example, when numerology changes, the UE performs random access on the new numerology to obtain finer timing accuracy. In one example, preamble transmission is performed on the largest available numerology (e.g. largest subcarrier spacing) irrespective of which numerology the UE prefers or which numerology the UE is presently operating on.

The NRs and the 5G networks based on them will have diverse requirements in terms of data rates, latency, and coverage. The NRs will support higher data rates, lower latency and higher reliability than current systems, and the devices and methodologies of the present inventions discussed above with references to FIGS. 1-9 will take advantage of those advanced capabilities by providing for an efficient, flexible and adaptable initial access. About data rates, the enhanced mobile broadband (eMBB) is expected to support a peak data rate of 20 Gbps for downlink and 10 Gbps for uplink, and the user experienced data rates expected to be in the order of three times the rate of IMT (international mobile telecommunications)-Advanced. Simultaneously, the NR systems will support ultra low latency and high reliability. For example, the ultra reliable and low latency communication (URLLC) systems are expected to provide an ultra-low latency of 0.5 milliseconds for each of UL and DL for user plane latency and a high reliability of $1-10^{-5}$ within 1 millisecond). Also, massive machine type communication (mMTC) compliant devices will require high connection density (e.g. 1,000,000 devices/$km^2$ in urban environment), large coverage in harsh environments ([164 dB] maximum coupling loss (MCL)), and extremely long-life battery for low cost devices ([15 years]).

To meet the above demands, the 3GPP (3rd Generation Partnership Project) is considering the option is to allow (frequency division multiplexing) FDM/TDM (time division multiplexing) of different types of subframes and/or sub-bands with different subcarrier numerologies (i.e., different subcarrier-spacing values and correspondingly different OFDM symbol lengths) in a single system bandwidth, where the different subcarrier values are chosen according to the use-case specific requirements. In this case, a UE may be configured with a single or multiple subcarrier numerologies, possibly depending upon UE capability or category as well as the use cases the UE supports. For example, although a network may provide different numerologies across the whole system bandwidth, a UE may be capable of accessing/processing only one of those numerologies. The UE may also be capable of accessing/processing a different bandwidth from the networks offered bandwidth. On the other hand, in another example, the UE may be capable of accessing/processing multiple numerologies offered by the network. 3GPP has proposed that operation of initial access under such diverse conditions needs to be studied to accommodate different capabilities/requirements of networks and UEs. Inventions of the subject disclosure provide solutions that are flexible, efficient and adaptable in providing initial access between UEs and networks of diverse numerology capabilities.

The various aspects described above can be applied to or implemented in exemplary wireless communication systems and devices described below. In addition, the various aspects are described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, or some other modulation techniques.

Figure 12:
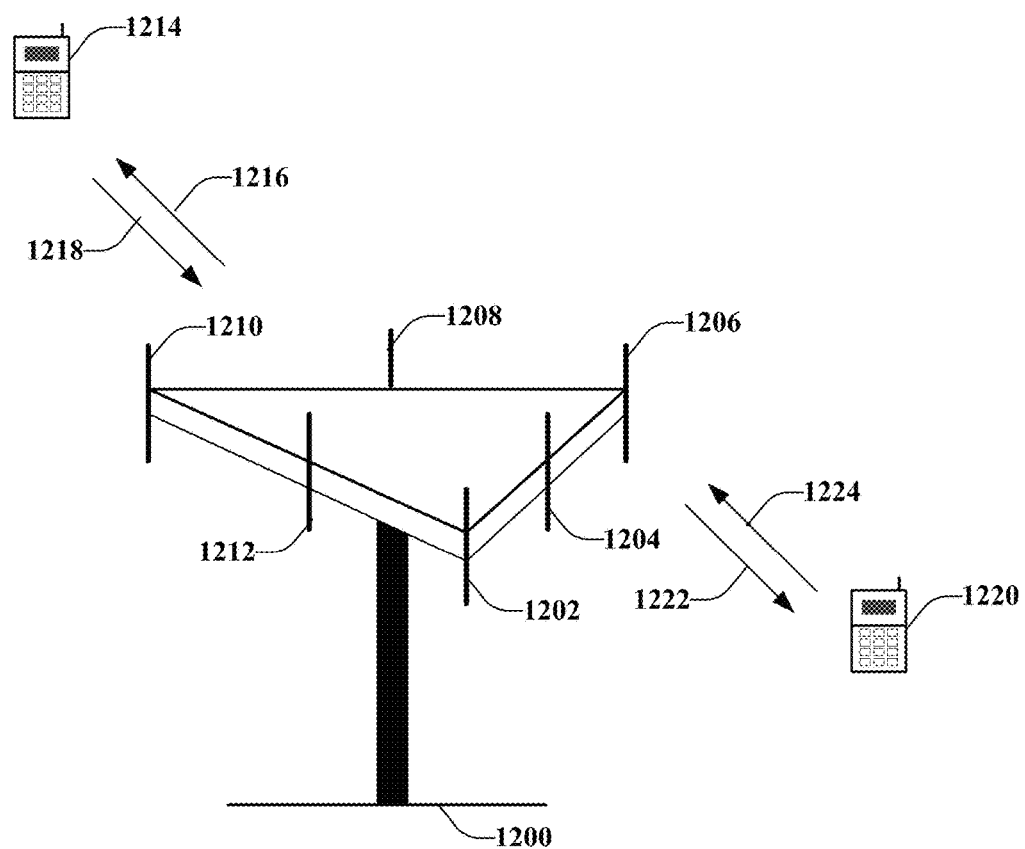
FIG. 12 illustrates a multiple access wireless communication system, in accordance with one or more embodiments described herein.

FIG. 12 illustrates a multiple access wireless communication system in accordance with one or more embodiments described herein. An access network 1200 (AN) includes multiple antenna groups, one including 1202 and 1204, another including 1206 and 1208, and an additional including 1210 and 1212. In FIG. 12, only two antennas illustrated for each antenna group, however, more or fewer antennas may be utilized for each antenna group. Access terminal 1214 (AT) is in communication with antennas 1210 and 1212, where antennas 1210 and 1212 transmit information to access terminal 1214 over forward link 1216 (e.g., DL) and receive information from access terminal 1214 over reverse link 1218 (e.g., UL). Access terminal (AT) 1216 is in communication with antennas 1204 and 1206, where antennas 1204 and 1206 transmit information to access terminal (AT) 1220 over forward link 1222 (e.g., DL) and receive information from access terminal (AT) 1220 over reverse link 1224 (e.g., UL). In a FDD system, communication links 1216, 1218, 1222, and 1224 may use different frequency for communication. For example, forward link 1216 may use a different frequency than that used by reverse link 1218.

Each group of antennas and/or the area in which they are designed to communicate is often referred to as a sector of the access network. In the embodiment, antenna groups each are designed to communicate to access terminals in a sector of the areas covered by access network 1200.

In communication over forward links 1216 and 1220, the transmitting antennas of access network 1200 may utilize beamforming in order to improve the signal-to-noise ratio of forward links for the different access terminals 1214 and 1220. Also, an access network using beamforming to transmit to access terminals scattered randomly through its coverage normally causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 13:
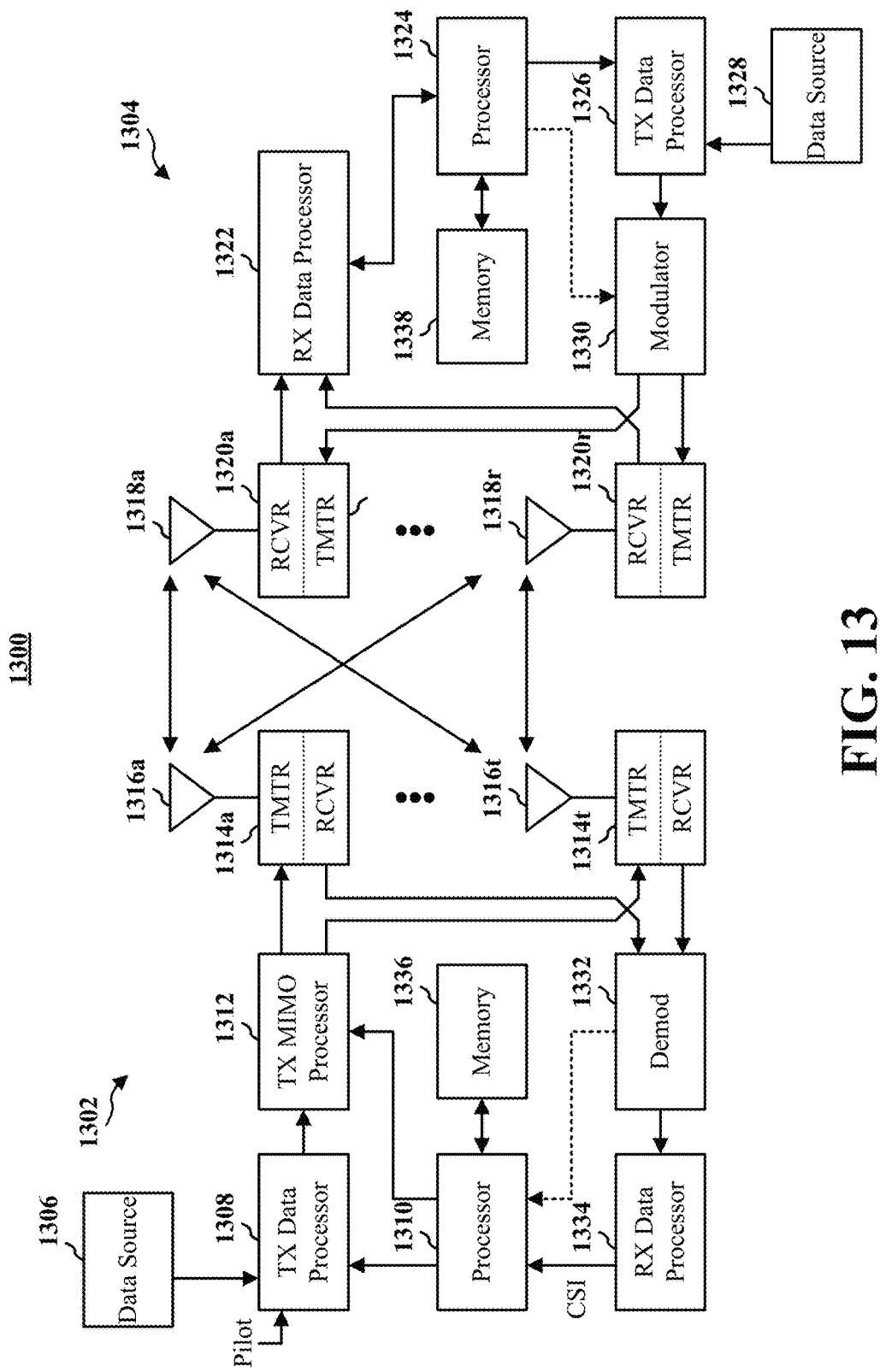
FIG. 13 illustrates a simplified block diagram of an embodiment a MIMO system that includes of a transmitter system and a receiver system, in accordance with one or more embodiments described herein.

FIG. 13 illustrates a simplified block diagram of an embodiment a MIMO system 1300 that includes of a transmitter system 1302 (also known as the access network) and a receiver system 1304 (also known as access terminal (AT) or user equipment (UE)) in accordance with one or more embodiments described herein. At the transmitter system 1302, traffic data for a number of data streams is provided from a data source 1306 to a transmit (TX) data processor 1308.

In one embodiment, each data stream is transmitted over a respective transmit antenna. TX data processor 1308 formats, codes, and interleaves the traffic data for each data stream based on a particular coding scheme selected for that data stream to provide coded data.

The coded data for each data stream may be multiplexed with pilot data using 01-DM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 1310.

The modulation symbols for all data streams are then provided to a TX MIMO processor 1312, which may further process the modulation symbols (e.g., for OFDM). TX MIMO processor 1312 then provides $N_T$ modulation symbol streams to $N_T$ transmitters (TMTR) 1314a through 1314t. In certain embodiments, TX MIMO processor 1312 applies beamforming weights to the symbols of the data streams and to the antenna from which the symbol is being transmitted.

Each transmitter 1314 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1314a through 1314t are then transmitted from $N_T$ antennas 1316a through 1316t, respectively.

At receiver system 1304, the transmitted modulated signals are received by $N_R$ antennas 1318a through 1318r and the received signal from each antenna 1318 is provided to a respective receiver (RCVR) 1320a through 1320r. Each receiver 1320 conditions (e.g., filters, amplifies, and downconverts) a respective received signal, digitizes the conditioned signal to provide samples, and further processes the samples to provide a corresponding "received" symbol stream.

An RX data processor 1322 then receives and processes the $N_R$ received symbol streams from $N_R$ receivers 1320 based on a particular receiver processing technique to provide $N_T$ "detected" symbol streams. The RX data processor 1322 then demodulates, deinterleaves, and decodes each detected symbol stream to recover the traffic data for the data stream. The processing by RX data processor 1322 is complementary to that performed by TX MIMO processor 1312 and TX data processor 1308 at transmitter system 1302.

A processor 1324 periodically determines which precoding matrix to use (discussed below). Processor 1324 formulates a reverse link message comprising a matrix index portion and a rank value portion.

The reverse link message may comprise various types of information regarding the communication link and/or the received data stream. The reverse link message is then processed by a TX data processor 1326, which also receives traffic data for a number of data streams from a data source 1328, modulated by a modulator 1330, conditioned by transmitters 1320a through 1320r, and transmitted back to transmitter system 1302.

At transmitter system 1302, the modulated signals from receiver system 1304 are received by antennas 1316, conditioned by receivers 1314, demodulated by a demodulator 1332, and processed by a RX data processor 1334 to extract the reserve link message transmitted by the receiver system 1304. Processor 1310 then determines which pre-coding matrix to use for determining the beamforming weights then processes the extracted message.

Memory 1336 can be used to temporarily store some buffered/computational data from 1332 or 1334 through processor 1330, store some buffed data from 1306, or store some specific program codes. Further, memory 1338 may be used to temporarily store some buffered/computational data from 1322 through processor 1324, store some bufferedd data from 1328, or store some specific program codes.

Figure 14:
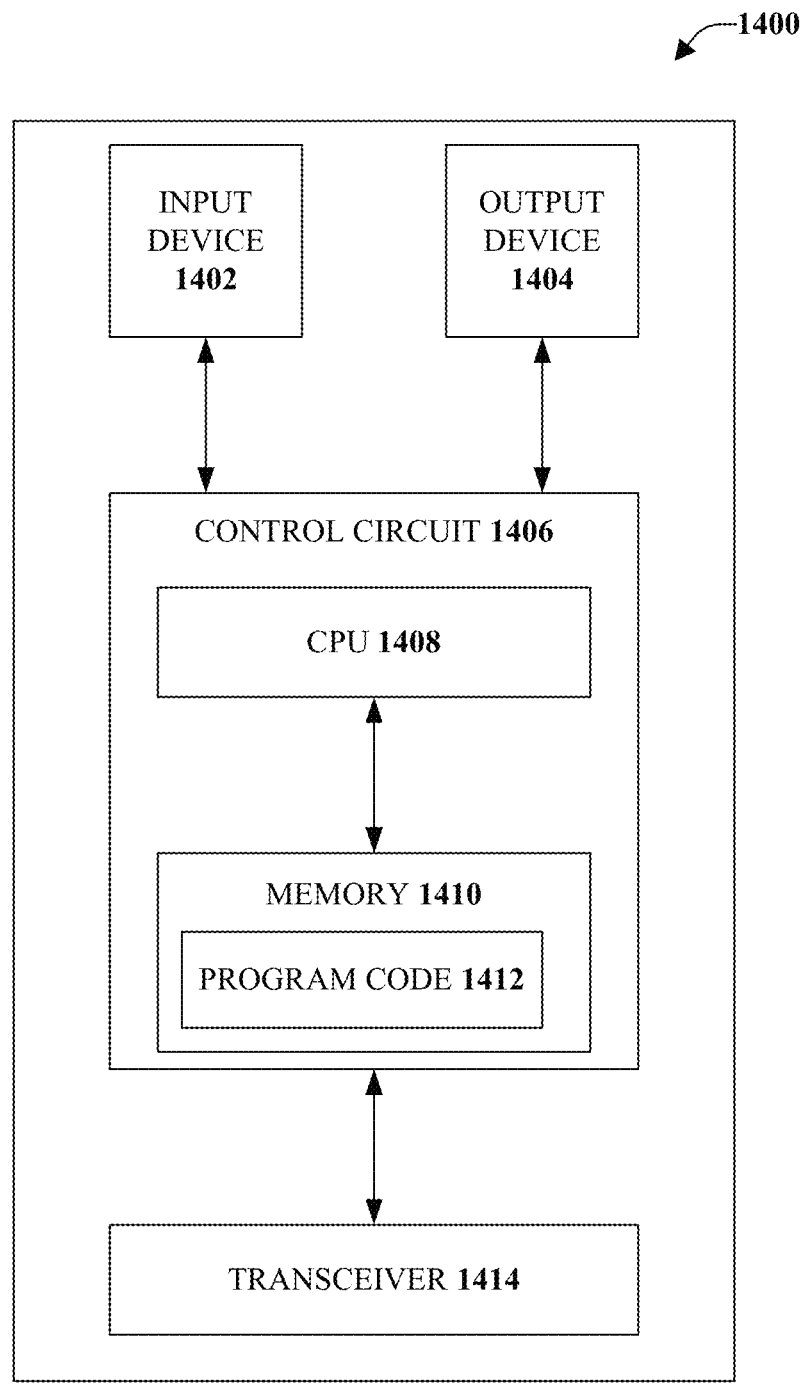
FIG. 14 illustrates an alternative simplified functional block diagram of a communication device, in accordance with one or more embodiments described herein.

Turning to FIG. 14, illustrated is an alternative simplified functional block diagram of a communication device 1400 in accordance with one or more embodiments described herein. As illustrated in FIG. 14, the communication device 1400 in a wireless communication system can be utilized for realizing the Mobile devices (or ATs) 1214 and 1220 in FIG. 12, and the wireless communications system can be the LTE system. The communication device 1400 can include an input device 1402, an output device 1404, a control circuit 1406, a central processing unit (CPU) 1408, a memory 1410, a program code 1412, and a transceiver 1414. The control circuit 1406 executes the program code 1412 in the memory 1410 through the CPU 1408, thereby controlling an operation of the communications device 1400. The communications device 1400 can receive signals input by a user through the input device 1402, such as a keyboard or keypad, and can output images and sounds through the output device 1404, such as a monitor or speakers. The transceiver 1414 is used to receive and transmit wireless signals, delivering received signals to the control circuit 1406, and outputting signals generated by the control circuit 1206 wirelessly.

Figure 15:
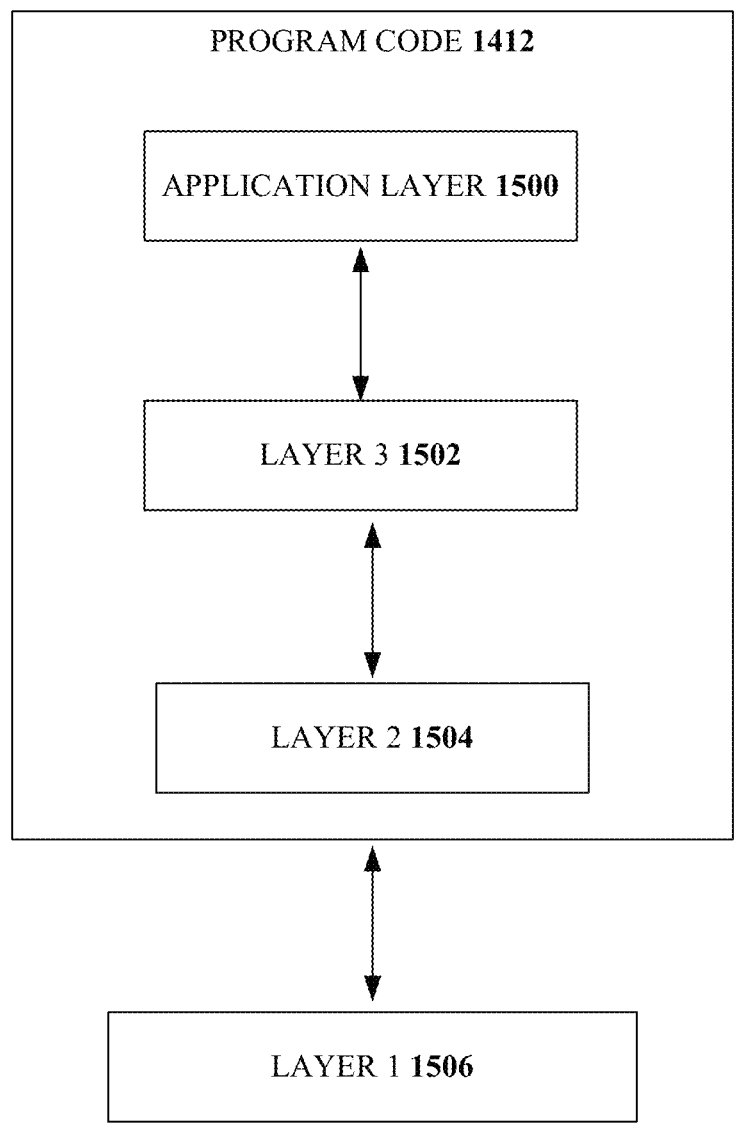
FIG. 15 is a simplified block diagram of the program code shown in FIG. 14, in accordance with one or more embodiments described herein.

FIG. 15 is a simplified block diagram of the program code 1412 shown in FIG. 14 in accordance with one or more embodiments described herein. In this embodiment, the program code 1412 includes an application layer 1500, a Layer 3 portion 1502, and a Layer 2 portion 1504, and is coupled to a Layer 1 portion 1506. The Layer 3 portion 1502 generally performs radio resource control. The Layer 2 portion 1504 generally performs link control. The Layer 1 portion 1506 generally performs physical connections. For LTE or LTE-A system, the Layer 2 portion 1504 may include a Radio Link Control (RLC) layer and a Medium Access Control (MAC) layer. The Layer 3 portion 1502 may include a Radio Resource Control (RRC) layer.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects, a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs.

Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not taken into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving from a network, by a mobile device comprising a processor, synchronization information and system information by way of a first numerology selected by a numerology selector of the network from a numerology database stored at the network, the numerology database comprising a plurality of numerologies that comprise the first numerology, a second numerology, and a third numerology;
performing, by the mobile device, a random access procedure by way of a second numerology selected by the numerology selector; and
receiving, by the mobile device, from the network, information to configure the mobile device to use a third numerology after completion of the random access procedure, wherein the first numerology is a default numerology for the network to transmit the synchronization information and the system information to the mobile device.

2. The method of claim 1, wherein the second numerology is the same as the first numerology, and wherein selected ones of the numerologies are added to or removed from the numerology database by the mobile device.

3. The method of claim 1, wherein configuration of the mobile device to use the third numerology is performed after the mobile device commences a connected mode of operation.

4. A method, comprising:
performing a first set of procedures related to an initial access, by a mobile device comprising a processor, by way of a first numerology selected by a numerology selector of a network from a numerology database stored at the network, the numerology database comprising a plurality of numerologies that comprise the first numerology, a second numerology, and a third numerology;
performing a specific procedure related to the initial access after performing the first set of procedures, by the mobile device, by way of the second numerology;
performing a second set of procedures related to the initial access after performing the specific procedure, by the mobile device, by way of the second numerology; and
receiving, by the mobile device, from the network, information to configure the mobile device to use the third numerology after completion of the random access procedure, wherein the first numerology is a default numerology for the network to transmit synchronization information and system information to the mobile device.

5. The method of claim 4, wherein the default numerology is a specific numerology among a plurality of numerologies that the mobile device is capable of using.

6. The method of claim 4, wherein the second numerology is a numerology selected from a plurality of numerologies that the mobile device is capable of using.

7. The method of claim 4, wherein the specific procedure is performed to acquire the system information from a network on which the mobile device is camping.

8. The method of claim 7, wherein the system information indicates numerologies that are supported by the network.

9. The method of claim 7, wherein the system information includes information common to a plurality of numerologies supported by the network.

10. The method of claim 7, wherein the system information includes a random access parameter.

11. The method of claim 7, wherein the system information includes information specific to a particular numerology.

12. The method of claim 4, wherein the specific procedure is a random access procedure.

13. The method of claim 4, wherein the first numerology is defined by a first subcarrier spacing for an Orthogonal Frequency-Division Multiplexing (OFDM) scheme and the second numerology is defined by a second subcarrier spacing for the Orthogonal Frequency-Division Multiplexing (OFDM) scheme, wherein the first subcarrier spacing is different from the second subcarrier spacing.

14. A method, comprising:
transmitting, by a network, synchronization information and system information by way of a first numerology selected by a numerology selector of the network from a numerology database stored at the network, the numerology database comprising a plurality of numerologies that comprise the first numerology, a second numerology, and a third numerology;
interacting, by the network, with a mobile device via a random access procedure by way of a second numerology selected by the numerology selector; and
transmitting, by the network, information to configure the mobile device to use a third numerology after completion of the random access procedure, wherein the first numerology is a default numerology for the network to transmit the synchronization information and the system information to the mobile device.

15. The method of claim 14, wherein the second numerology is the same as the first numerology, and wherein selected ones of the numerologies are added to or removed from the numerology database by the mobile device.

16. The method of claim 14, wherein configuration of the mobile device to use the third numerology is performed after the mobile device commences a connected mode of operation.

17. A user equipment (UE), comprising:
a control circuit;
a processor installed in the control circuit; and
a memory installed in the control circuit and operatively coupled to the processor, wherein the processor is configured to execute a program code stored in the memory to perform operations comprising:
receiving from a network, by a mobile device comprising a processor, synchronization information and system information by way of a first numerology selected by a numerology selector of the network from a numerology database stored at the network, the numerology database comprising a plurality of numerologies that comprise the first numerology, a second numerology, and a third numerology;
performing, by the mobile device, a random access procedure by way of a second numerology selected by the numerology selector; and
receiving, by the mobile device, from the network, information to configure the mobile device to use a third numerology after completion of the random access procedure, wherein the first numerology is a default numerology for the network to transmit the synchronization information and the system information to the mobile device.

18. The UE of claim 17, wherein the second numerology is the same as the first numerology, and wherein selected ones of the numerologies are added to or removed from the numerology database by the mobile device.

19. The UE of claim 17, wherein configuration of the mobile device to use the third numerology is performed after the mobile device commences a connected mode of operation.

* * * * *